April 10, 1956 W. A. GUEFFROY 2,741,380
MACHINE FOR EMPTYING LOADED CARTONS
Filed Oct. 29, 1954 5 Sheets-Sheet 1

INVENTOR.
WALTER A. GUEFFROY
BY Charles H. Lyne
Leland R. McCann
George W. Reiber
ATTORNEYS

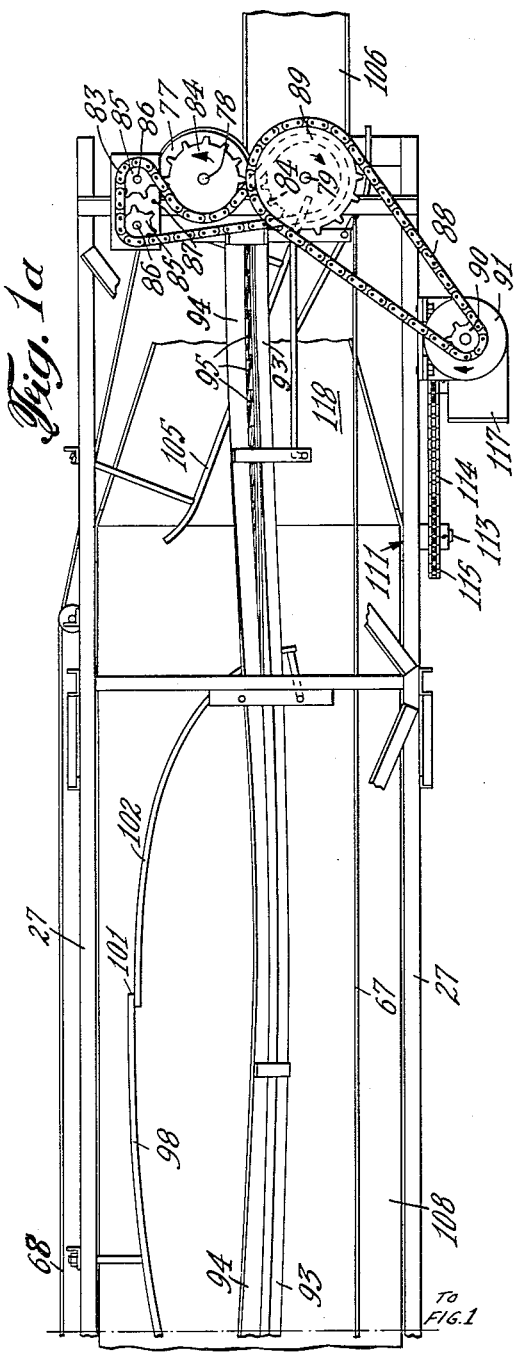

April 10, 1956   W. A. GUEFFROY   2,741,380
MACHINE FOR EMPTYING LOADED CARTONS
Filed Oct. 29, 1954   5 Sheets-Sheet 3

INVENTOR.
WALTER A. GUEFFROY
BY Charles H. Erne
Leland R. McCann
George W. Reiber
ATTORNEYS April 10, 1956 W. A. GUEFFROY 2,741,380
MACHINE FOR EMPTYING LOADED CARTONS
Filed Oct. 29, 1954 5 Sheets-Sheet 4
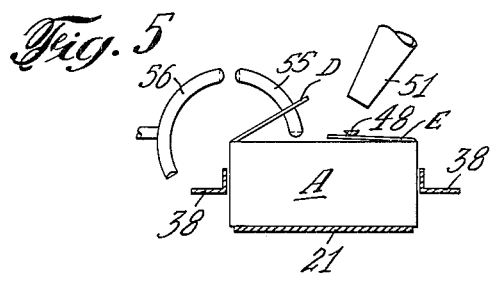
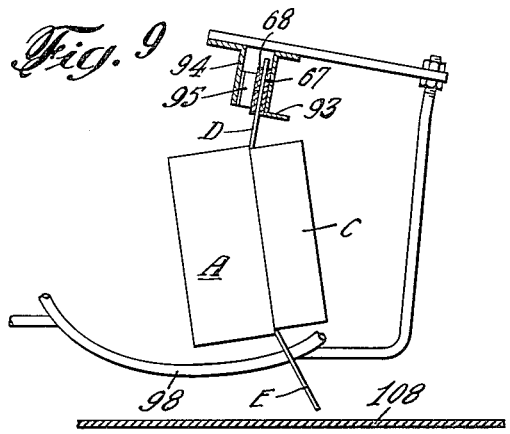
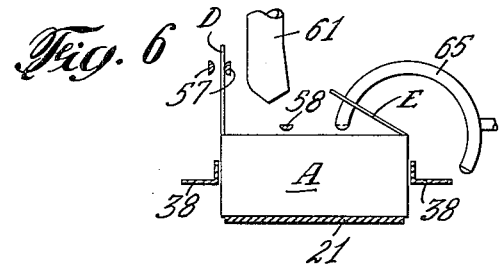
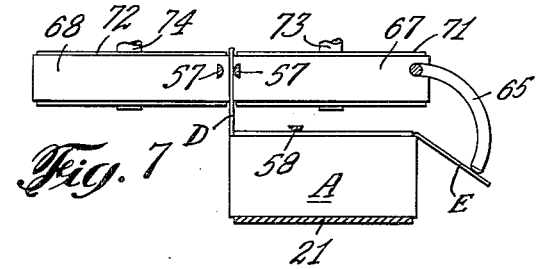
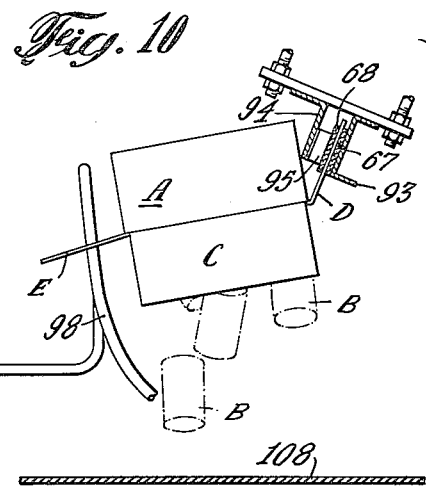
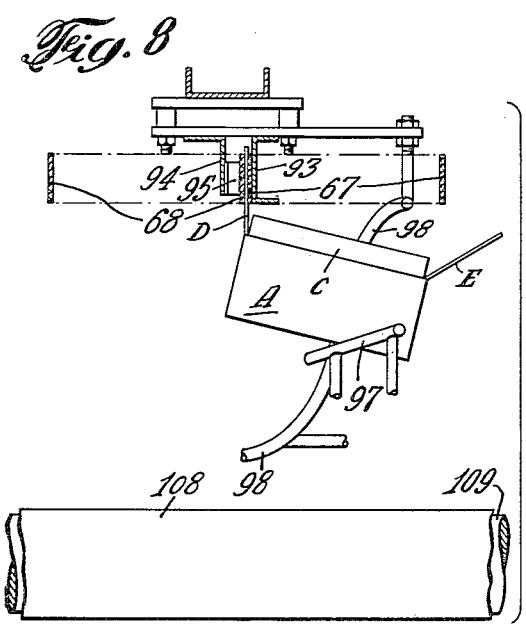
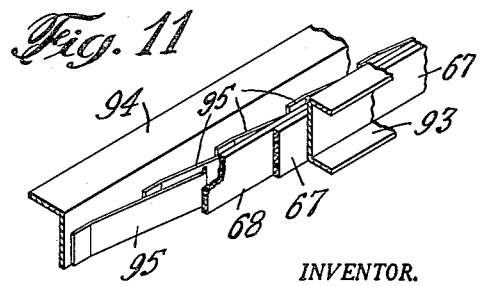
INVENTOR.
WALTER A. GUEFFROY
BY Charles H. Erne
Leland R. McCann
George W. Reiber
ATTORNEYS April 10, 1956 W. A. GUEFFROY 2,741,380
MACHINE FOR EMPTYING LOADED CARTONS
Filed Oct. 29, 1954 5 Sheets-Sheet 5

INVENTOR.
WALTER A. GUEFFROY
BY Charles H. Erne
Leland R. McCann
George W. Reiber
ATTORNEYS 0# United States Patent Office 2,741,380
Patented Apr. 10, 1956

2,741,380

MACHINE FOR EMPTYING LOADED CARTONS

Walter A. Gueffroy, Roslyn Heights, N. Y., assignor to American Can Company, New York, N. Y., a corporation of New Jersey Application October 29, 1954, Serial No. 465,670

17 Claims. (Cl. 214—304)

The present invention relates to machines for emptying loaded cartons and has particular reference to devices for initially feeding a loaded carton in natural upright position and feeding and supporting a carton by one of its closure flaps and for swinging the carton into a position to permit the contents of the carton to be removed therefrom.

An object of the invention is the provision of a machine for emptying loaded cartons wherein the cartons first travel through the machine in a natural upright position in a substantially continuous procession and then through simple gripping and guiding devices suspend the loaded cartons from one of their closure flaps and swing them into a finally inverted position to release their contents in a simple and rapid operation which results in high efficiency and low maintenance costs.

Numerous other objects and advantages of the invention will be apparent as it is better understood from the following description, which, taken in connection with the accompanying drawings, discloses a preferred embodiment thereof.

Referring to the drawings:

Figures 1 and 1a taken together are top plan views illustrating the carton emptying machine embodying the instant invention;

Figs. 2 and 2a taken together are side elevations of the machine illustrated in Figs. 1 and 1a;

Fig. 4 is an enlarged end elevation of the machine as viewed from the right in Fig. 2a;

Figs. 5, 6, 7, 8, 9, 10 are enlarged transverse sectional views taken substantially along the respective lines 5—5, 6—6, 7—7, 8—8, 9—9, 10—10 in Fig. 2;

Fig. 11 is a perspective view of a detail illustrated in Figs. 8, 9 and 10;

Figs. 12, 13, 14, 15 and 16 are enlarged transverse sectional views taken substantially along the respective lines 12—12, 13—13, 14—14, 15—15, 16—16 in Fig. 2a;

As a preferred or exemplary embodiment of the instant invention the drawings illustrate a machine for emptying loaded fibre cartons A (Fig. 17) filled with empty cans or containers B as they come from the can making factory to be removed from the cartons for filling or other operations, for example in a cannery. The cartons A are rectangular in shape and have a sealed bottom and an open top having a pair of inwardly folded and unsealed inner flaps C overlapped by a pair of unsealed outer flaps D, E. This is a conventional shipping carton commonly used unsealed for shipping empty cans to packers' plants and reused in a sealed condition for reshipping the filled cans to consumers. At the packing plant the cans are removed from the cartons for filling and the empty cartons are conveyed to a point beyond the filling operations for refilling with the filled cans and are then sealed for shipment.

Figure 18:
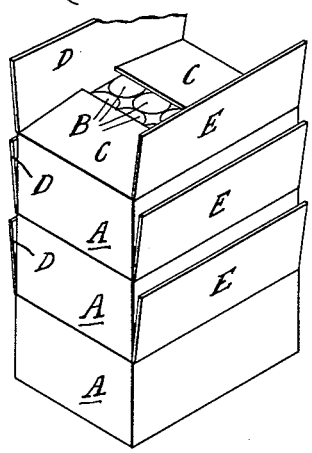
Fig. 18 is a perspective view showing a preferred manner of shipping the cartons nested one within the other in stacked relation.
Figure 17:
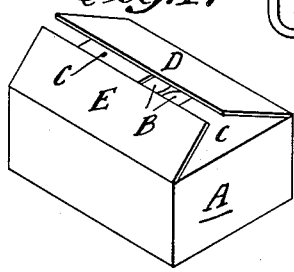
Fig. 17 is a perspective view of a loaded carton to be emptied in the machine.

A preferred method of shipping the unsealed cartons loaded with empty cans from the can manufacturing plant to the packers' plant is shown in Fig. 18 wherein the cartons are stacked upon each other with the carton above nested within the open outer flaps D, E of the carton below. The open outer flaps of the cartons tend to hold the cartons in vertically stacked formation. Only the top carton of each stack has its outer flaps folded inwardly against the top of the carton, but even these flaps are left unsealed. As a consequence of this method of shipping the empty cans in cartons to the packers, the machine of the present invention which empties the carton is provided with devices to receive and operate on cartons with their outer flaps D, E in either a closed position as shown in Fig. 17 or in an open position as shown in Fig. 18 or in any variation of these positions.

In the machine for emptying the cartons A, the cartons are received in a substantially continuous procession in end-to-end relation and in an upright position with their unsealed flaps on top of the cartons and with their outer flaps D, E extending longitudinally of the machine. As each carton A enters the machine one of the unsealed outer flaps, preferably the flap D, if not already open, is hinged open through substantially 90 degrees from its substantially horizontal closed position to an upright position as shown in Figs. 5 and 6. Following this, the opposite outer flap E, if not already open, is hinged open, preferably through an angle of approximately 210 degrees from its substantially horizontal closed position to a fully open substantially horizontal position as shown in Fig. 7.

The upright flap D is then gripped tightly to support the entire carton in a suspended relation and is continued to be thus supported while it is advanced through the machine. During this advancement the carton body is pivoted or swung on its gripped outer flap D, into a finally inverted position as shown in Fig. 10. In this position the opposite outer flap E is held away from the top or open end of the carton so that the weight of the cans B within the carton push open the inner flaps C. This action releases the cans B from the carton and permits them to fall or tumble or cascade from the carton in haphazard fashion. The empty carton A is thereafter pivoted back into an upright position and in this position is released and discharged from the machine for delivery to any suitable place of deposit to await the reception of the filled cans. The empty cans B are conveyed to an unscrambler which arranges them in proper position and relation for delivery to a filling machine or the like.

The structure of the machine will now be described and explained. The cartons A in an upright position and filled with empty cans B are received at the entrance end of the machine (at the left as viewed in Figs. 1 and 2) on the upper run of a horizontally disposed endless belt entrance conveyor 21 (Figs. 1, 2, 3 and 5). This conveyor operates over an idler pulley 22 and a driving pulley 23 disposed in spaced and parallel relation and mounted on an idler shaft 24 and a driving shaft 25 respectively. The shafts 24, 25 are journaled in bearings formed in a pair of spaced and parallel horizontal channel beams 26 which constitute parts of an elongated structural steel main frame generally indicated by the numeral 27. The driving shaft 25 of the entrance conveyor 21 is rotated continuously by an endless chain 31 which operates over a sprocket 32 on the driving shaft 25 and a driving sprocket 33 carried on a power shaft 34 of a conventional speed reduction unit 35 connected to and driven by an electric motor 36 carried on the main frame 27.

Cartons A received on the entrance conveyor 21 are advanced endwise along a straight line path of travel for the length of the conveyor, the advancing cartons being guided by a pair of straight, spaced and parallel guide rails 38 secured to the channel beams 26 (see Figs. 1, 2, 3 and 5). During this travel of the cartons, each carton progressively passes a plurality of devices for locating its outer flaps D, E in predetermined positions for subsequent use. The primary object of these devices is to insure that the flap D is in an opened vertical position substantially perpendicular or normal to the top of the carton so that it can be gripped and advanced by means hereafter referred to and that the flap E is in an opened substantially horizontal position projecting outwardly away from the carton to expose the inner flaps C at the top of the carton. At the same time the inner flaps C must be temporarily retained in their closed position to prevent jamming against the side flap opening and guiding devices so as to prevent damage to the carton.

Since the outer flaps D, E of the entering cartons may be in an open substantially upright position as shown in Fig. 18 or may be in a closed substantially horizontal position as shown in Fig. 17 or may be in any in-between position due to the inherent springiness of the fibrous material of the cartons, it is first necessary to reposition at least the flap E to insure against damage to the carton. If the flap D is in a nearly vertical position initially it remains in this position without damaging effect.

Accordingly, a carton A advancing with the entrance conveyor 21 first passes under a continuously rotating wheel 41 (Fig. 1) which is mounted on and driven by a horizontally disposed shaft 42 forming a part of a conventional speed reduction unit 43 driven by an electric motor 44 carried on the main frame 27. The wheel 41 is located slightly off center relative to the path of travel of the advancing carton and is adapted to engage, close and temporarily hold in closed position an outer flap D of a carton passing under the wheel and having its flap D in a position which interferes with the wheel as the carton passes under it. If the flap is sufficiently upright initially it does not interfere with the wheel and passes by unengaged as the carton passes the wheel. However in this latter case the wheel engages the inner flaps C and insures that these flaps, especially the following flap C does not lift up sufficiently to prevent proper closing of the outer flap E, if open, as will be explained hereinafter.

Where the flap D is pushed down against the top of the carton by the wheel 41 it is temporarily held in this position as the carton continues to advance, after leaving the wheel, by a pair of spaced and stationary spring fingers 46, 47 which depend into the path of travel of the top of a carton advancing with the conveyor 21. This holding down of flap D insures holding the inner flaps C in position in case the outer flap E is too far open.

Simultaneously with this action on the flap D, the flap E along the opposite edge of the carton is engaged by a curved stationary closing rail 48 (Figs 1, 2 and 3) disposed in the path of the carton which the carton passes under during its advancement. The rail 48 is secured to the main frame 27 and is shaped to engage the leading edge of the flap E in whatever position the flap may be and pivot the flap into a closed position against the top of the carton to insure holding the inner flaps C in place (see Fig. 5).

The closing rail 48 continues to hold the outer flap E, and through this the inner flaps C in closed position until the carton advances beyond the spring fingers 46, 47 and reaches a position adjacent an air blast nozzle 51 (Fig. 3) connected to and supplied with air under pressure from a blower 52 mounted on the main frame 27. The blower 52 is actuated by an electric motor 53. The nozzle 51 is disposed adjacent the path of travel of the free edge of the outer flap D and is located in such spaced relation to the spring finger 47 that a closed flap D of a carton passing the nozzle is free of the spring finger 47.

As a result, the air issuing from the nozzle 51 is forced under the free edge of the flap D and thus raises or lifts the flap an amount at least sufficient to cause the flap to ride up on the initial projecting end of a curved aligning rail 55 disposed just beyond the nozzle 51 (see Figs. 1, 2, 3 and 5) in the path of travel of the carton and depending from the main frame 27. A similar curved aligning rail 56, curved in the reversed direction, and depending from the main frame outside the path of travel of the carton, is provided to catch and guide the flap D in case the air blast blows the flap too far back. These rails 55, 56 converge toward and merge into a pair of straight, spaced and parallel tail extensions 57 which as the carton advances, guide into and temporarily hold the flap D in the upright perpendicular position heretofore mentioned.

Simultaneously with the riding up of the outer flap D on the aligning rail 55, or between the rails 55, 56 the advancing carton moves under a horizontal hold-down rail 58 which is disposed at a level substantially even with the top of the carton and located in a position formerly occupied by the outer flap D. This rail 58 engages against the top of the carton and continues to retain the inner flaps C in their closed position when these flaps ride out from under the terminal end of the closing rail 48.

With the inner flaps C held down in position by the hold-down rail 58, and the outer flap E released from the closing rail 48 by advancement of the carton beyond the terminal end of the rail 48, the outer flap E is free for opening into the position hereinbefore mentioned. This opening operation is effected by an auxiliary air blast nozzle 61 which is disposed beyond the nozzle 51 and is located adjacent the path of travel of the free edge of the flap E as best shown in Fig. 6. The nozzle 61 is supplied with a continuous blast of air under pressure from a blower 62 actuated by an electric motor 63, both of which are mounted on the main frame 27.

As a carton A moves into position adjacent the auxiliary nozzle 61, the air issuing therefrom is forced under the free edge of the outer flap E and thus raises or lifts the flap an amount at least sufficient to cause it to ride up onto the adjacent initial projecting end of a curved opening rail 65 (Figs. 1, 2 and 6) disposed in the path of travel of the carton just beyond the nozzle 61 and depending from the frame 27. As the flap E rides along this rail 65, it is pivoted on the carton through approximately 210 degrees from a substantially horizontal closed position on top of the carton to a substantially horizontal fully open position extending outwardly away from the carton as best shown in Fig. 7, to fully expose the held down inner flaps C on the top of the carton.

Figure 4:
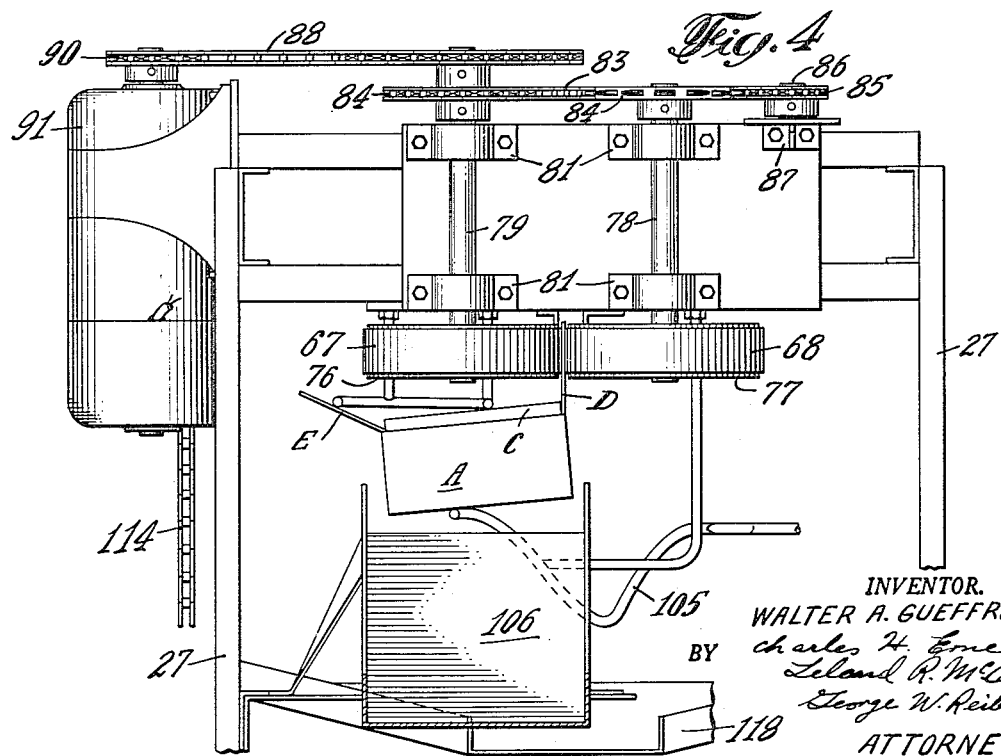

During the latter portion of this opening operation of the outer flap E and while the inner flaps C are still held closed by the hold-down rail 58, the advancing carton carries the vertically aligned outer flap D, into engagement with a flap gripping and carton suspending device. This gripping and suspending device preferably comprises a pair of spaced and parallel endless belts 67, 68 (Figs. 1, 1a, 2, 2a, 4, and 8) disposed on edge and extending horizontally from the terminal end of the entrance conveyor 21 to the discharge end of the machine (at the right in Figs. 1a and 2a). Adjacent the terminal end of the entrance conveyor 21, the belts 67, 68 operate over a pair of adjacently disposed idler pulleys 71, 72 (Figs. 1 and 2) mounted on vertical shafts 73, 74 journaled in bearing brackets 75 secured to the main frame 27. At the discharge end of the machine the belts 67, 68 operate over a pair of adjacently disposed driving pulleys 76, 77 (Figs. 1a, 2a and 4) mounted on vertical drive shafts 78, 79 journaled in bearing brackets 81 secured to the main frame 27.

Figure 1:
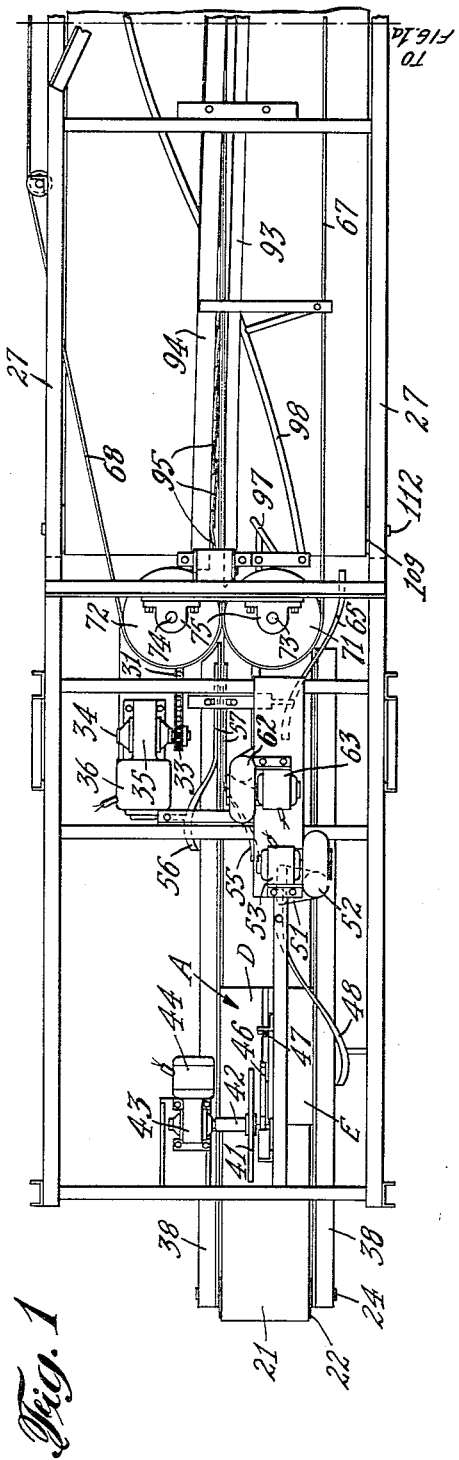
Figure 2:
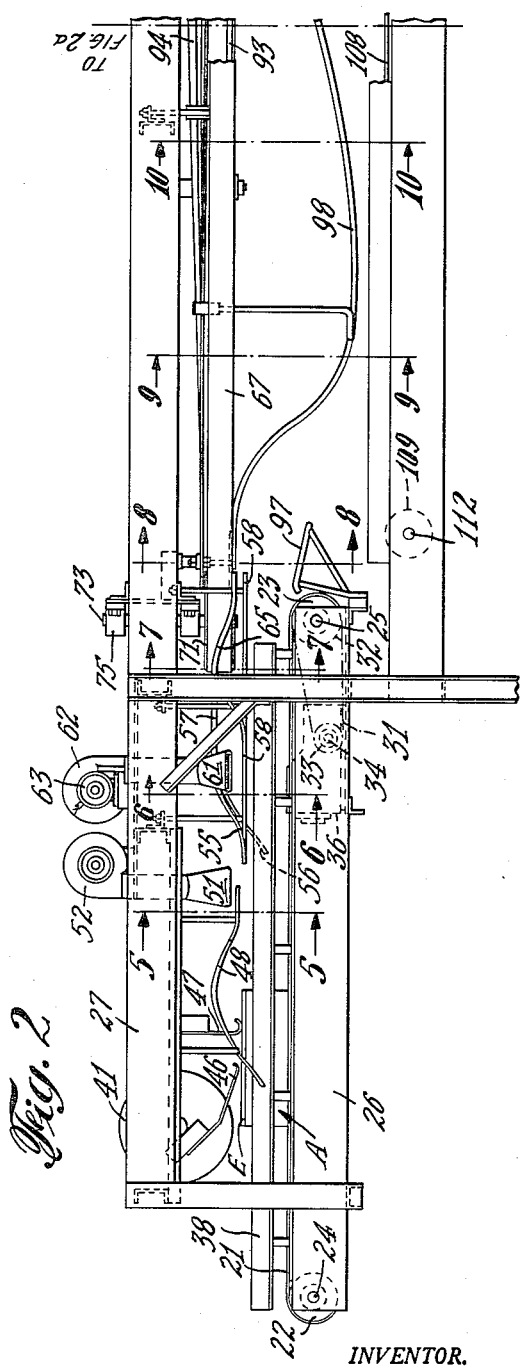
Figure 3:
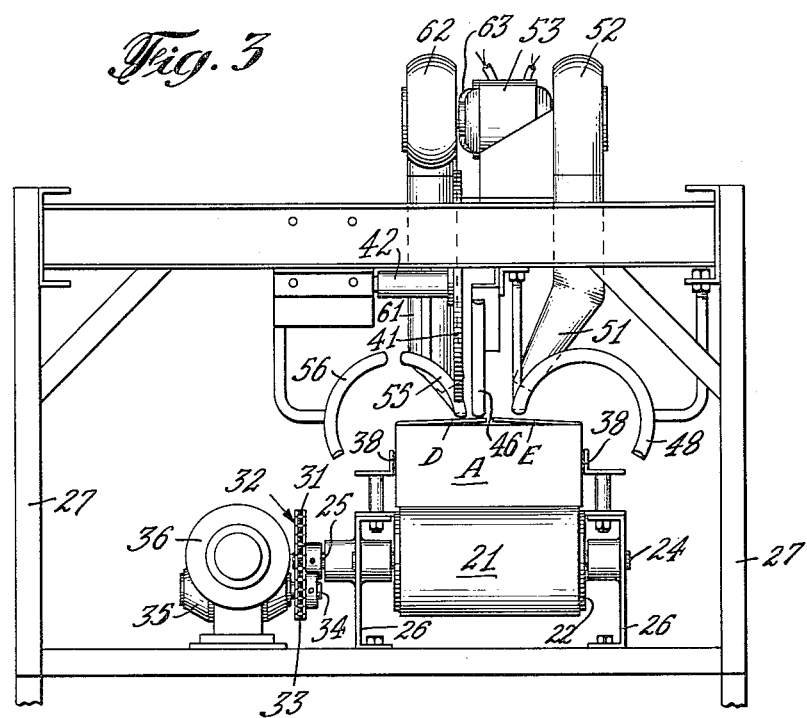
Fig. 3 is an enlarged end elevation of the entrance end of the machine as viewed from the left in Fig. 2.

The driving shafts 78, 79 are rotated continuously and in unison in opposite directions to propel the inner runs of the belts 67, 68 in a direction toward the discharge end of the machine. This is effected by an endless chain 83 which operates over driving sprockets 84 mounted on the vertical drive shafts 78, 79 and over a pair of idler sprockets 85 as shown in Fig. 2. The idler sprockets 85 are mounted on short shafts 86 carried in bearing brackets 87 secured to the main frame 27. The driving shaft 79 is driven by an endless chain 88 which operates over a sprocket 89 on the shaft 79 and over a pinion 90 of an electric motor 91 secured to the main frame 27.

The inner runs of the gripper belts 67, 68 are disposed in contiguous relation for tightly gripping the vertically positioned outer flap D of the carton between them as best shown in Fig. 10. For this purpose, the inner runs of the belts 67, 68 operate between a pair of spaced and parallel pressure plates 93, 94 which are suspended from the main frame 27 and which extend along the entire length of the inner runs of the belts. The inner face of the pressure plate 94 is provided with a plurality of overlapping leaf springs 95 (Fig. 11) having one end attached to the plate and the other end free and pressing against the inner run of the belt 68 to force this belt under pressure against the inner run of the belt 67 while the belt 67 is backed up by the pressure plate 93. These leaf springs 95 are provided along the entire length of the pressure plate 94.

Hence as the entrance conveyor 21 advances the carton A toward the gripper belts 67, 68 with the outer flap D in a vertical position and the outer flap E in its fully open position as hereinbefore explained, the vertical flap D enters between the inner runs of the moving gripper belts 67, 68 and is tightly compressed between the belts to securely hold the flap against displacement. As soon as the outer flap D is well within the bite of the gripper belts 67, 68, these belts take over the further advancement of the carton A and the carton rides off the terminal end of the entrance conveyor 21 onto a short declining guide rail 97 secured to the channel beams 26.

The guide rail 97 supports the carton temporarily adjacent the edge nearest the open flap E, as shown in Fig. 8 while the other side of the carton is supported by and hangs from the tightly gripped flap D. While the carton moves along this short declining rail 97, it moves away from the inner flap hold down rail 58 to free these inner flaps C and the open flap E rides under a helically curved inverting rail 98 which is secured to the main frame 27 and extends adjacent the path of travel of the carton for nearly one half the length of the inner runs of the gripper belts 67, 68 (see Figs. 1, 1a, 2, 2a).

As the carton A continues to be advanced and supported by the gripper belts 67, 68, through the grip on the flap D, the carton rides off the declining rail 97 and is now fully supported by and suspended from the flap D gripped by the belts. Thus supported, the carton immediately swings or pivots downwardly at its connection with its gripped flap D into the position shown in Fig. 9. This swinging action permits the now unconfined inner flaps C to partially open as shown in Fig. 9.

Figure 12:
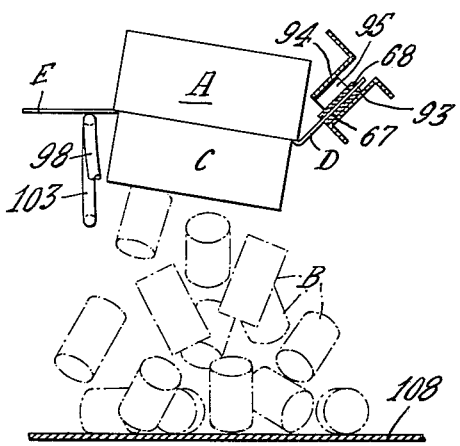

As the advancement of the suspended carton progresses the helical guide rail 98, through contact with the open free outer flap E continues the swinging movement of the carton in the direction of its initial swing and thus pivots the carton into a fully upside down or inverted position as shown in Figs. 10 and 12, the free edge of the carton being supported by the flap E and the guide rail 98. To facilitate this free swinging action, the pressure plates 93, 94 and the inner runs of the gripper belts 67, 68 confined therebetween, preferably are twisted as shown in the drawings to permit full swinging action of the carton without interference.

Figure 13:
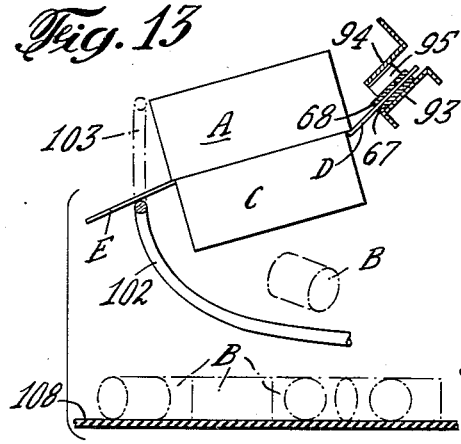

With the carton in this inverted position, the empty cans B within the carton force open the inner flaps C and thus fall or cascade out of the carton. In order to insure that all cans in the carton are removed, the carton is given a sudden jolt or kick to knock free any cans that may still be in the carton. For this purpose, the inverting guide rail 98 abruptly terminates at 101 (Figs. 1a and 2a), and continues at a lower level as a rail 102 thus providing a sharp step 103 at the terminal end of the guide rail 98. As the inverted carton passes the abrupt termination 101 of the guide rail 98 and step 103 it suddenly falls or drops to the lower level of the continuing rail 102 as show in Fig. 13 and thereby gives the carton a sudden jolt. This removes any remaining cans. In this manner the cartons are completely emptied.

Figure 14:
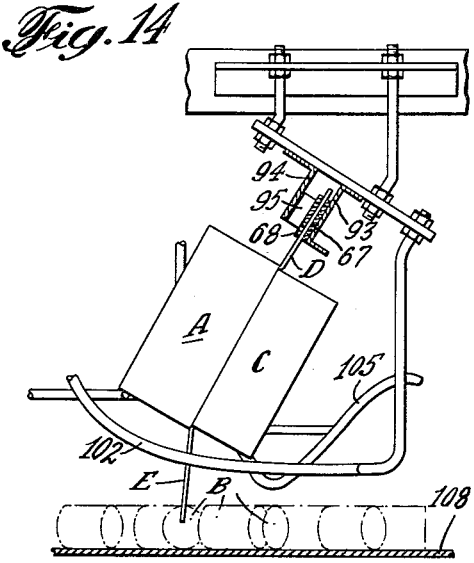
Figure 15:
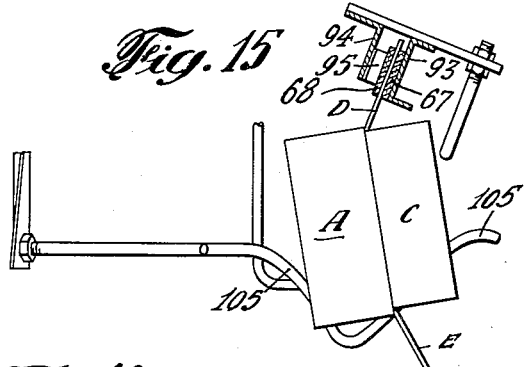
Figure 16:
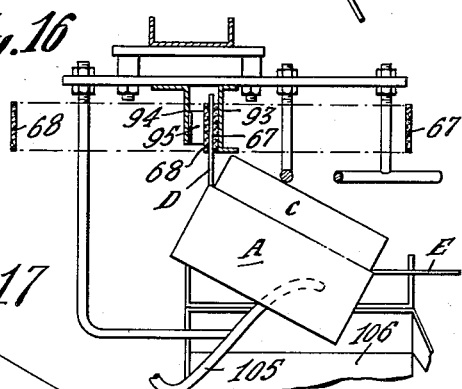

During further advancement of the carton, still supported and suspended by its gripped flap D, the free outer flap E rides along the rail 102. This rail is shaped to permit the carton to swing back to its original suspended position as shown in Fig. 14. At this point the rail 102 terminates (see Figs. 1a and 2a) and the bottom of the carton rides up onto a curved righting rail 105 (as shown in Figs. 1a, 2a and 15) which is suspended from the main frame 27. This rail continues to the discharge end of the machine and swings the suspended carton into a substantially upright position as shown in Fig. 16.

At the discharge end of the machine, the suspended upright carton is carried over a discharge chute 106 and at this point in its travel, the flap D travels out from between the gripper belts 67, 68 and is thus released from the belts. The released empty carton A thus falls onto the discharge chute 106 and is directed in upright position to any suitable place of deposit to await reception of the filled or otherwise worked cans B as hereinbefore mentioned.

The cans B upon falling from the inverted cartons A as hereinbefore mentioned are received on a continuously moving endless collector belt or conveyor 108 which is located below the path of travel of the cartons. This collector belt 108 extends from the terminal end of the entrance conveyor 21 to the discharge end of the machine and operates over a pair of spaced pulleys 109, 111 (Figs. 1, 1a, 2 and 2a) mounted on shafts 112, 113 journaled in bearings on the main frame 27. The shaft 113 is the driving shaft and is rotated continuously by an endless chain 114 which operates over a sprocket 115 on the shaft 113 and over a sprocket 116 of a conventional speed reduction unit 117 actuated by the electric motor 91.

As the cans B cascade onto the collector belt 108, the belt carries them to a discharge chute 118 (Figs. 1a and 2a) disposed adjacent the discharge end of this machine. This chute directs them preferably to an unscrambling machine which arranges them in an orderly fashion in an upright position for entrance into a filling or other machine, preparatory to return to the empty cartons A for shipment.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for emptying loaded cartons having outer and inner unsealed closure flaps, comprising in combination means for gripping a flap of a said carton to support said carton, and means for swinging said carton on said gripped flap into an inverted position to empty said carton of its load.

2. A machine for emptying loaded cartons having outer and inner unsealed closure flaps, comprising in combination means for gripping a flap of a said carton to support said carton, means for swinging said carton on said gripped flap into an inverted position to empty said carton of its load, and means for swinging the empty carton back into its original position for discharge from the machine.

3. A machine for emptying loaded cartons having outer and inner unsealed closure flaps, comprising in combination means for gripping a flap of a said carton to support said carton, means for swinging said carton on said gripped flap into an inverted position to empty said carton of its load, and means for jolting said inverted carton to insure complete emptying of said carton.

4. A machine for emptying loaded cartons having outer and inner unsealed closure flaps, comprising in combination means for suspending and supporting a said carton by one of its flaps, and means for swinging said carton on said gripped flap into an inverted position to empty said carton of its load.

5. A machine for emptying loaded cartons having outer and inner unsealed closure flaps, comprising in combination a conveyor for advancing along a path of travel a said carton in an upright position with its flaps on top of said carton, means for pivoting one of said outer flaps into a predetermined position, means for gripping said positioned outer flap for supporting said carton in suspended relation free of said conveyor, and means for swinging said suspended carton on said gripped flap into an inverted position to empty said carton of its load.

6. A machine for emptying loaded cartons having outer and inner unsealed closure flaps, comprising in combination a conveyor for advancing along a path of travel a said carton in an upright position with its flaps on top of said carton, means for pivoting one of said outer flaps into a predetermined free position, means disposed adjacent said conveyor for temporarily confining said other flaps in a closed position against the top of said carton, movable means disposed at the terminal end of said conveyor for gripping said positioned outer flap and for further advancing said carton for supporting said carton in suspended relation free of said conveyor and free of said flap confining means, means for moving said gripping means, and means for swinging said suspended carton on said gripped flap into an inverted position to empty said carton of its load.

7. A machine for emptying loaded cartons having a pair of opposed unsealed outer flaps overlapping a corresponding pair of opposed unsealed inner flaps, the combination of a conveyor for advancing along a path of travel a said carton in an upright position with its flaps on top of said carton, means for pivoting one of said outer flaps into a predetermined open position, means disposed adjacent said conveyor for holding said inner flaps in a closed position, means for fully opening said other outer flap to expose said inner flaps, movable means for gripping said first mentioned positioned outer flap and for removing said carton by said flap from said conveyor and from said inner flap holding means for supporting and advancing said carton in a suspended relation, means for moving said gripper means, and means for engaging said fully opened other outer flap for swinging said suspended carton on said gripped flap into an inverted position to empty said carton of its load.

8. A machine for emptying loaded cartons having a pair of opposed unsealed outer flaps overlapping a corresponding pair of opposed unsealed inner flaps, the combination of a conveyor for advancing along a path of travel of said carton in an upright position with its flaps on top of said carton, a nozzle disposed adjacent said conveyor for directing a blast of air under one of said outer flaps for initially raising said flap, a stationary guide rail disposed adjacent said nozzle for engaging under and pivoting said raised flap into a predetermined opened position, a stationary hold down rail disposed above said conveyor for engaging and holding down said inner flaps in a closed position, an auxiliary nozzle also disposed adjacent said conveyor beyond said first mentioned nozzle for directing a blast of air under the other of said outer flaps for initially raising said other flap, a stationary opening rail disposed adjacent said conveyor for engaging under and pivoting said raised other flap into a fully open position to expose said inner flaps, movable means disposed beyond said conveyor for gripping said pre-positioned first mentioned flap and for removing said carton by said flap from said conveyor and from said inner and outer flap engaging rails for supporting and advancing said carton in a freely suspended relation, means for moving said gripper means, and a stationary inverting rail disposed adjacent the path of travel of said gripper means for engaging said fully opened other outer flap for swinging said suspended carton on said gripped flap into an inverted position to empty said carton of its load.

9. A machine for emptying loaded cartons having outer and inner unsealed closure flaps, comprising a pair of endless belts having contiguous inner runs for gripping between them a flap of a said carton for supporting said carton by said gripped flap, means for actuating said belts in unison, and means for pivoting said carton on said gripped flap into an inverted position to empty said carton of its load.

10. A machine for emptying loaded cartons having outer and inner unsealed closure flaps, comprising a pair of endless belts having contiguous inner runs for gripping between them a flap of a said carton for supporting said carton by said gripped flap, means for pressing said inner runs of said belts against said gripped flap to tightly hold said flap against displacement, means for actuating said belts in unison, and means for pivoting said carton on said gripped flap into an inverted position to empty said carton of its load.

11. A machine for emptying loaded cartons having outer and inner unsealed closure flaps, comprising a pair of endless belts having contiguous inner runs for gripping between them a flap of a said carton for supporting said carton by said gripped flap, a pair of stationary plates disposed in spaced and parallel relation on opposite sides of said inner runs of said belts for guiding and backing up said belts, yieldable pressure means on one of said plates for pressing the inner runs of said belts against the opposing other of said plates for tightly compressing said belts against said gripped flap to hold said flap against displacement, means for actuating said belts in unison, and means for pivoting said carton on said gripped flap into an inverted position to empty said carton of its load.

12. A machine for emptying loaded cartons having outer and inner unsealed closure flaps, comprising a pair of endless belts having contiguous inner runs for gripping between them a flap of a said carton for supporting said carton by said gripped flap, means for guiding the inner runs of said belts along a predetermined path of travel, means for actuating said belts in unison, and means for pivoting said carton on said gripped flap into an inverted position to empty said carton of its load.

13. A machine for emptying loaded cartons having outer and inner unsealed closure flaps, comprising a pair of endless belts having contiguous inner runs for gripping between them a flap of a said carton for supporting said carton by said gripped flap, means for actuating said belts in unison, and a stationary guide rail disposed adjacent the path of travel of the inner runs of said belts and engageable against said carton for pivoting said carton on said gripped flap into an inverted position to empty said carton of its load.

14. A machine for emptying loaded cartons having outer and inner unsealed closure flaps, comprising a pair of endless belts having contiguous inner runs for gripping between them a flap of a said carton for supporting said carton by said gripped flap, means for actuating said belts in unison, means for pivoting said carton on said gripped flap into an inverted position to empty said carton of its load, and a conveyor disposed under the path of travel of said inner runs of said belts for collecting the load emptied from said carton and for carrying it to a place of deposit.

15. A machine for emptying loaded cartons having outer and inner unsealed closure flaps, comprising a pair of endless belts having contiguous inner runs for gripping between them a flap of a said carton for supporting said carton by said gripped flap, means for actuating said belts in unison, a stationary guide rail disposed adjacent the path of travel of the inner runs of said belts and engageable with said carton for pivoting said carton on said gripped flap into an inverted position to empty said carton of its load, and an auxiliary continuing guide rail disposed adjacent the path of travel of the inner runs of said belts for pivoting said carton on said gripped flap back into its originally received position for discharge from said belts.

16. A machine for emptying loaded cartons having outer and inner unsealed closure flaps, comprising a pair of endless belts having contiguous inner runs for gripping between them a flap of a said carton for supporting said carton by said gripped flap, means for actuating said belts in unison, a stationary guide rail disposed adjacent the path of travel of the inner runs of said belts and engageable with said carton for pivoting said carton on said gripped flap into an inverted position to empty said carton of its load, and a continuing guide rail disposed adjacent the path of travel of the inner runs of said belts at a lower level than said first mentioned guide rail and providing at the terminal end of said first mentioned guide rail an abrupt step to suddenly lower and jolt said inverted carton to insure fully emptying said carton of its load.

17. In a machine for emptying loaded cartons having closure flaps in initially closed position, the combination of means for advancing said cartons towards an unloading station, means associated with said advancing means for gradually bringing at least one of said closure flaps into a predetermined open position relative to said carton, a pair of endless belts having contiguous inner runs for frictionally gripping between them said positioned flap for supporting and further advancing said carton by said flap into and through said unloading station, and means for actuating said belts in unison.

No references cited.